(12) United States Patent
Yamada

(10) Patent No.: US 11,894,792 B2
(45) Date of Patent: Feb. 6, 2024

(54) MOTOR CONTROL DEVICE

(71) Applicant: DENSO CORPORATION, Kariya (JP)

(72) Inventor: Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 199 days.

(21) Appl. No.: 17/650,532

(22) Filed: Feb. 10, 2022

(65) Prior Publication Data

US 2022/0271701 A1 Aug. 25, 2022

Related U.S. Application Data

(63) Continuation of application No. PCT/JP2020/038253, filed on Oct. 9, 2020.

(30) Foreign Application Priority Data

Oct. 15, 2019 (JP) ................ 2019-188428

(51) Int. Cl.
*H02P 29/032* (2016.01)
*F16H 61/32* (2006.01)
*F16H 63/34* (2006.01)
*F16H 63/38* (2006.01)

(52) U.S. Cl.
CPC .......... *H02P 29/032* (2016.02); *F16H 61/32* (2013.01); *F16H 63/3466* (2013.01); *F16H 63/38* (2013.01); *F16H 2061/326* (2013.01)

(58) Field of Classification Search
CPC .............. H02P 29/032; F16H 61/32
USPC ........................................ 318/434
See application file for complete search history.

(56) References Cited

U.S. PATENT DOCUMENTS

2016/0141981 A1 5/2016 Yamada
2017/0307072 A1* 10/2017 Yamada ............. H02K 1/2753

FOREIGN PATENT DOCUMENTS

JP 3239576 B2 * 12/2001

* cited by examiner

*Primary Examiner* — Kawing Chan
(74) *Attorney, Agent, or Firm* — Nixon & Vanderhye P.C.

(57) ABSTRACT

A motor control device includes an energization control unit and an excessive return determination unit. The energization control unit controls energization to a motor. The excessive return determination unit determines whether or not there is a possibility of an excessive return exceeding an allowable return position, when a non-energization return control is performed to return a motor in a direction away from a movable limit position by an external force generated in the rotation transmission system by turning off the energization to the motor after driving the motor to the movable limit position where the drive is restricted by the drive limiting portion. When it is determined that there is no possibility of the excessive return, the energization is continuously turned off, and when it is determined that there is a possibility of the excessive return, a stop control configured to stop the motor by energizing is performed.

7 Claims, 8 Drawing Sheets

MOTOR CONTROL DEVICE

CROSS REFERENCE TO RELATED APPLICATIONS

This application is a continuation application of International Patent Application No. PCT/JP2020/038253 filed on Oct. 9, 2020, which designated the U.S. and based on and claims the benefits of priority of Japanese Patent Application No. 2019-188428 filed on Oct. 15, 2019. The entire disclosure of all of the above applications is incorporated herein by reference.

TECHNICAL FIELD

The present disclosure relates to a motor control device.

BACKGROUND

Conventionally, a motor control device for controlling a motor that is a drive source of a controlled object is known.

SUMMARY

An object of the present disclosure is to provide a motor control device capable of appropriately performing control after driving a motor to a movable limit position.

A motor control device of the present disclosure controls a drive of a motor in a motor drive system including a motor and a rotation transmission system. The rotation transmission system is driven by transmitting the rotation of the motor, and is provided with a drive limiting portion that limits the driving.

A motor control device includes an energization control unit and an excessive return determination unit. The energization control unit controls energization to the motor. The excessive return determination unit determines whether or not there is a possibility of an excessive return exceeding an allowable return position, when a non-energization return control is performed to return a motor in a direction away from a movable limit position by an external force generated in the rotation transmission system by turning off the energization to the motor after driving the motor to the movable limit position where the drive is restricted by the drive limiting portion. When it is determined that there is no possibility of the excessive return, the energization is continuously turned off, and when it is determined that there is a possibility of the excessive return, a stop control configured to stop the motor by energizing is performed. This makes it possible to appropriately perform control after driving the motor to the movable limit position.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In an assumable example, a motor control device for controlling a motor that is a drive source of a controlled object is known. For example, the motor control device controls a motor that is a drive source of a range switching mechanism, and after an abutting control that rotates the motor to a limit position of a movable range of the range switching mechanism, a non-energization return control is executed. When a rotation position of the motor reaches a target rotation position, a two phases of the motor are simultaneously energized to stop the motor.

By the way, in the above example, since energization is always performed to stop the motor after the non-energization return control, power consumption and heat generation are generated due to the energization. An object of the present disclosure is to provide a motor control device capable of appropriately performing control after driving a motor to a movable limit position.

A motor control device of the present disclosure controls a drive of a motor in a motor drive system including a motor and a rotation transmission system. The rotation transmission system is driven by transmitting the rotation of the motor, and is provided with a drive limiting portion that limits the driving.

A motor control device includes an energization control unit and an excessive return determination unit. The energization control unit controls energization to the motor. The excessive return determination unit determines whether or not there is a possibility of an excessive return exceeding an allowable return position, when a non-energization return control is performed to return a motor in a direction away from a movable limit position by an external force generated in the rotation transmission system by turning off the energization to the motor after driving the motor to the movable limit position where the drive is restricted by the drive limiting portion. When it is determined that there is no possibility of the excessive return, the energization is continuously turned off, and when it is determined that there is a possibility of the excessive return, a stop control configured to stop the motor by energizing is performed. This makes it possible to appropriately perform control after driving the motor to the movable limit position.

Figure 1:
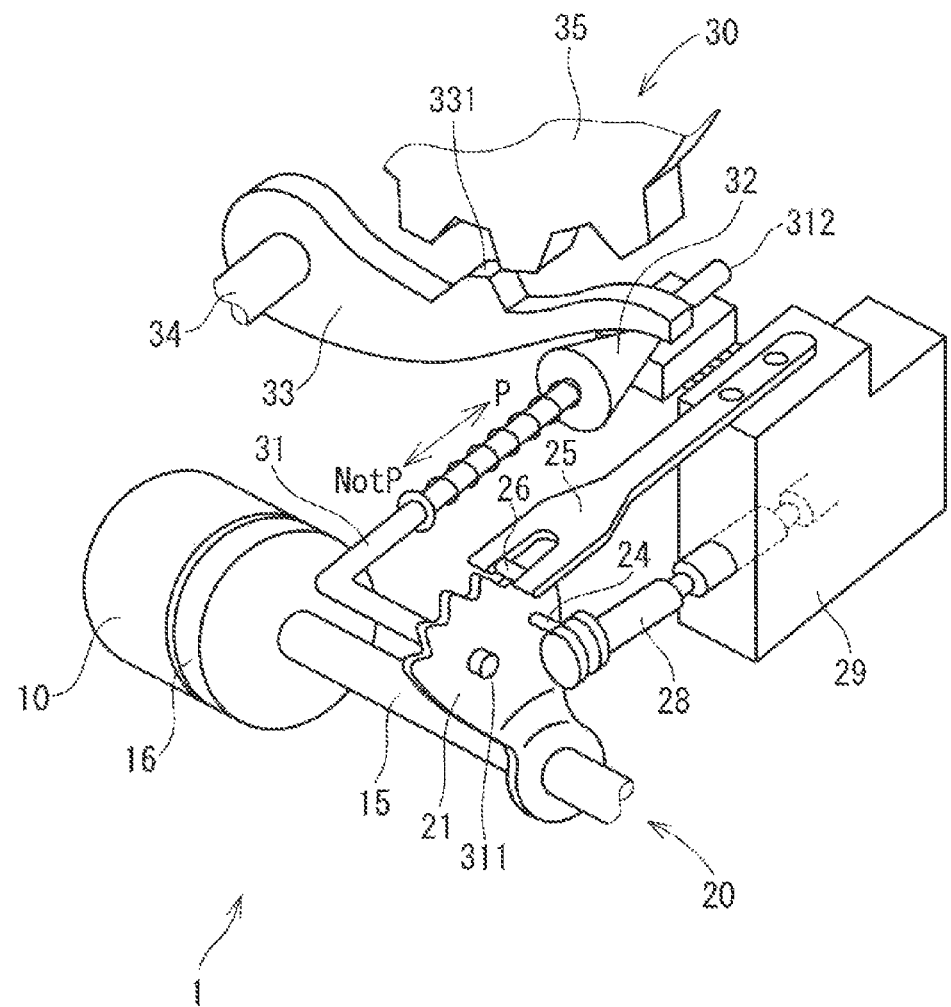
FIG. 1 is a perspective view showing a shift-by-wire system according to a first embodiment.
Figure 2:
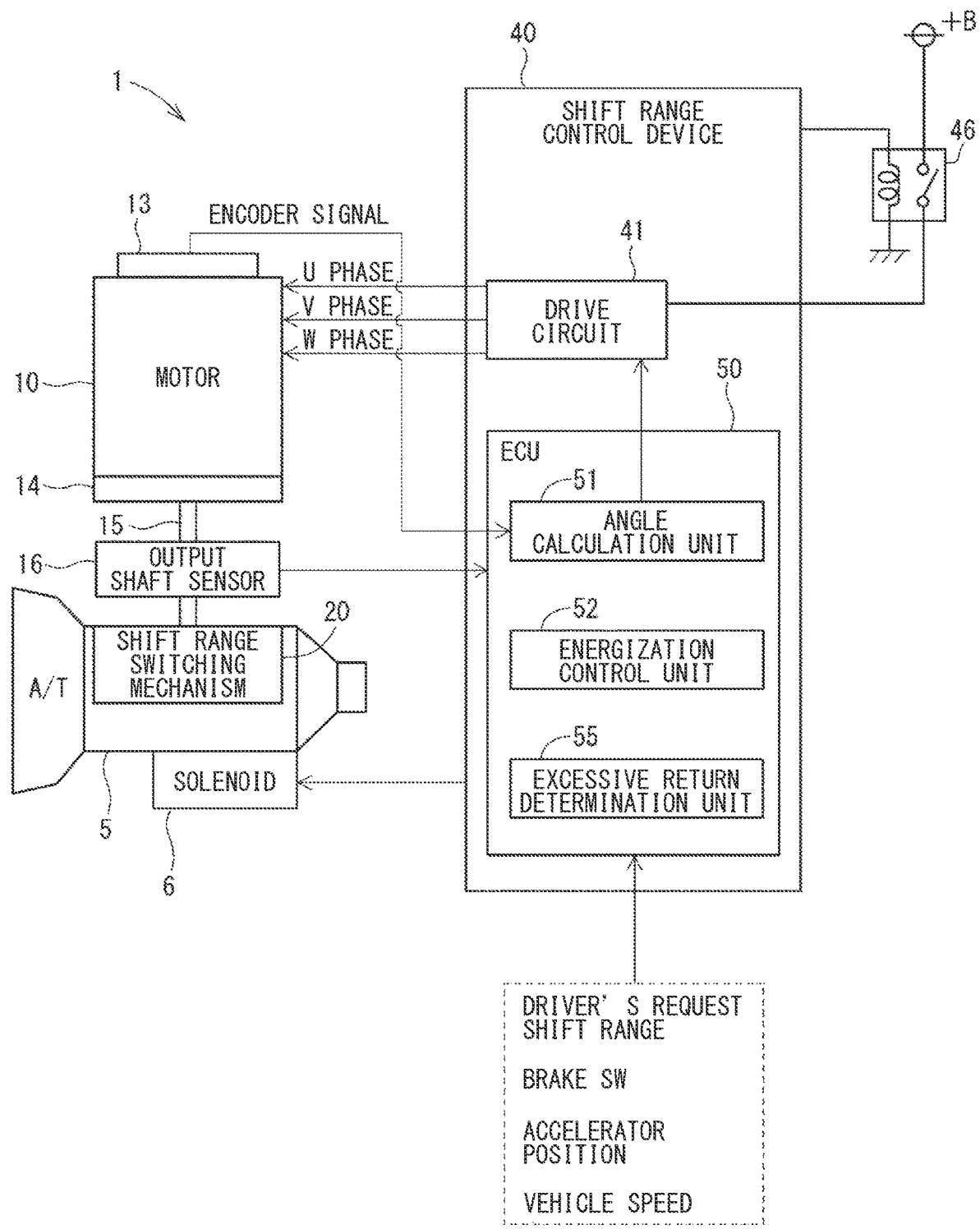
FIG. 2 is a diagram showing a schematic configuration of the shift-by-wire system according to the first embodiment.

Hereinafter, a motor control device according to the present disclosure will be described with reference to the drawings. Hereinafter, in a plurality of embodiments, a substantially equivalent configuration will be denoted by an identical reference, and explanation thereof will be omitted. A motor control device of the present embodiment is shown in FIGS. 1 to 7. As shown in FIGS. 1 and 2, a shift-by-wire system 1 includes a motor 10, a shift range switching mechanism 20, a parking lock mechanism 30, a shift range control device 40 as a motor control device, and the like.

The motor 10 rotates by being supplied with electric power from a battery mounted in a vehicle (not shown), and functions as a drive source for the shift range switching mechanism 20. The motor 10 of the present embodiment is a switched reluctance motor and has U-phase, V-phase, and W-phase motor windings wound around a stator (not shown).

As shown in FIG. 2, an encoder 13, which is a rotation angle sensor, detects a rotation position of a rotor (not shown) of the motor 10. The encoder 13 is, for example, a magnetic rotary encoder and is made up of a magnet that rotates integrally with the rotor, a magnetic detection hall integrated circuit (IC), and the like. The encoder 13 outputs an encoder signal, which is a pulse signal, at predetermined angles in synchronization with the rotation of the rotor.

A decelerator 14 is provided between a motor shaft of the motor 10 and an output shaft 15 to decelerate the rotation of the motor 10 and output the decelerated rotation to the output shaft 15. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 1, the shift range switching mechanism 20 has a detent plate 21, a detent spring 25, a detent roller 26, and the like, and transmits a rotational driving force output from the decelerator 14 to a manual valve 28 and a parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 reciprocates in the axial direction, a hydraulic supply path to a hydraulic clutch (not shown) is switched, and an engagement state of the hydraulic clutch is switched. In this way, the shift range is switched.

Figure 3:
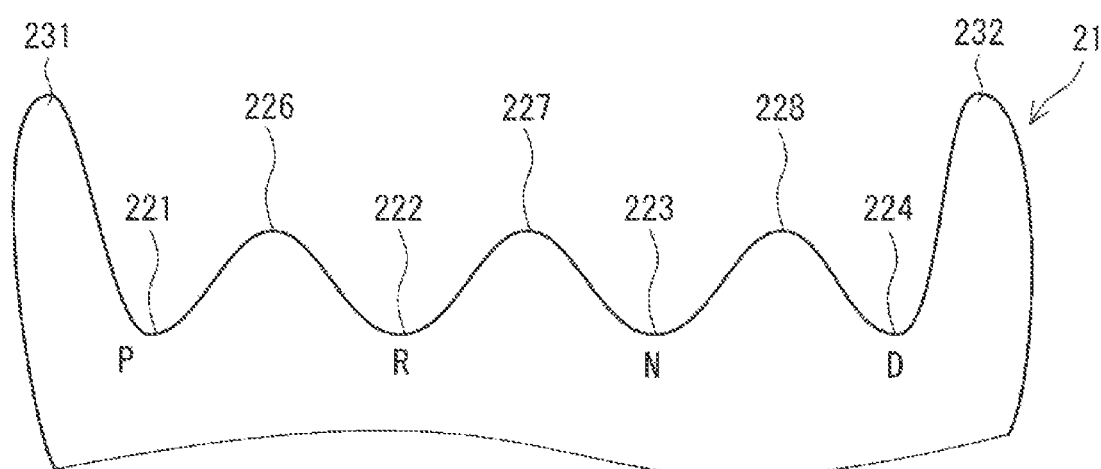
FIG. 3 is a schematic view showing a detent plate according to the first embodiment.

As shown in FIG. 3, on the detent spring 25 side of the detent plate 21, four valley portions 221 to 224 corresponding to the P (parking), R (reverse), N (neutral), and D (drive) ranges are formed. Further, a mountain portion 226 is provided between the valley portion 221 corresponding to the P range and the valley portion 222 corresponding to the R range. A mountain portion 227 is provided between the valley portion 222 corresponding to the R range and the valley portion 223 corresponding to the N range. A mountain portion 228 is provided between the valley portion 223 corresponding to the N range and the valley portion 224 corresponding to the D range. A first wall portion 231 for restricting the movement of the detent roller 26 is formed on a side of the valley portion 221 corresponding to the P range opposite to the mountain portion 226. A second wall portion 232 for restricting the movement of the detent roller 26 is formed on a side of the valley portion 224 corresponding to the D range opposite to the mountain portion 228.

As shown in FIG. 1, the detent spring 25 is an elastically deformable plate-like member, and the detent roller 26 as an engagement member is provided at a tip of the detent spring 25. The detent spring 25 urges the detent roller 26 toward the center of rotation of the detent plate 21. When a predetermined or more rotating force is applied to the detent plate 21, the detent spring 25 elastically deforms, and the detent roller 26 moves between the respective valley portions 221 to 224. The detent roller 26 fits into one of the valley portions 221 to 224 thereby to restrict movement of the detent plate 21. In this way, the axial position of the manual valve 28 and the state of the parking lock mechanism 30 are adjusted, and the shift range of the automatic transmission 5 is fixed. The detent roller 26 fits in any one of the valley portions 221 to 224 corresponding to the shift range. In the present embodiment, portions into which the detent roller 26 fits by the aid of a spring force of the detent spring 25 in accordance with the shift range is bottommost portions of the valley portions 221 to 224.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312.

The parking lock pawl 33 comes into contact with a conical surface of the conical member 32 and is provided so as to be swingable around the shaft part 34. On the parking gear 35 side of the parking lock pawl 33, a protrusion 331 that can mesh with the parking gear 35 is provided. When the conical member 32 moves in a P direction due to the rotation of the detent plate 21, the parking lock pawl 33 is pushed up and the protrusion 331 and the parking gear 35 mesh with each other. On the other hand, when the conical member 32 moves in a NotP direction, the meshing between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the rotation of the axle 95 is not restricted by the parking lock mechanism 30. When the shift range is the P range, the parking gear 35 is locked by the parking lock pawl 33 and the rotation of the axle is restricted.

As shown in FIG. 2, the shift range control device 40 includes a drive circuit 41, an ECU 50, and the like. The drive circuit 41 has a switching element (not shown), and switches the energization of each phase of the motor 10. A motor relay 46 is provided between the drive circuit 41 and a battery. The motor relay 46 is turned on while a start switch of the vehicle, such as an ignition switch, is turned on, so that power is supplied to the motor 10 side. Further, by turning off the motor relay 46, the supply of electric power to the motor 10 side is cut off.

The ECU 50 is configured mainly by a microcomputer and includes a CPU, a ROM, a RAM, an I/O, a bus line for connecting those configurations, and so on. Each process executed by the ECU 50 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

The ECU 50 is configured to control the switching of the shift range by controlling the drive of the motor 10 based on a driver requested shift range, a signal from a brake switch, a vehicle speed and the like. The ECU 50 controls the drive of a shift hydraulic control solenoid 6 based on a vehicle speed, an accelerator opening degree, a driver requested shift range, and the like. The shift hydraulic control solenoid 6 is controlled to manipulate a shift stage. The number of the shift hydraulic control solenoids 6 is determined according to the shift stage or the like. According to the present embodiment, a singular ECU 50 performs the control to drive the motor 10 and the solenoid 6. It is noted that, the ECU may be divided into a motor ECU, which is for motor control to control the motor 10, and an AT-ECU, which is for solenoid control. Hereinafter, a drive control of the motor 10 will be mainly described.

The ECU 50 has an angle calculation unit 51, an energization control unit 52, an excessive return determination unit 55, and the like. The angle calculation unit 51 counts the pulse edge of the encoder signal acquired from the encoder 13, and calculates the encoder count value θen. The encoder count value θen is a value corresponding to the rotation position of the motor 10 and corresponds to a "motor angle".

The energization control unit 52 controls energization to the motor 10 according to a drive mode. The drive mode of the present embodiment includes a wall contact mode, a wall return mode, and a normal control mode. The wall contact mode is a control mode in which the detent roller 26 is driven in a direction toward the wall portions 231 and 232 in order to learn using a movable limit position of the motor 10 as a reference position. Hereinafter, the "P wall contact" for learning the reference position on the first wall portion 231 side by bringing the detent roller 26 into contact with the first wall portion 231 will be mainly described.

The wall return mode is a control in which the detent roller 26 is brought into contact with the wall portions 231 and 232 and then returned to the valley portions 221 and 224. The normal control mode is a mode in which normal shift range switching is performed after learning the reference position. The drive mode at the time learning the reference position is the wall contact mode or the wall return mode.

In the P wall contact, when the drive mode is switched from the wall contact mode to the wall return mode, the energization to the motor 10 is turned off, and the detent roller 26 is returned from the wall portion 231 side to the valley portion 221 side by the restoring force in the rotation transmission system and the urging force of the detent spring 25.

The excessive return determination unit 55 determines whether or not there is a possibility of the excessive return in which the detent roller 26 returns excessively beyond the parking lock range in the wall return mode. Here, in a case that the detent roller 26 is returned to the valley portion 221 after the wall contact control, for example, when the encoder count value θen is within the control range including the target count value θcmd (for example, ±2 counts), if the stop control accompanied by energization of the motor 10 is performed, power consumption and heat generation occur. The stop control is, for example, a stationary phase energization control that continues energization to the two phases.

Here, in the wall return mode, if the motor 10 is stopped within a range satisfying an intended function of the controlled object, the stop control accompanied by energization of the motor 10 is not always necessary. In the present embodiment, the range satisfying the intended function of the controlled object is a parking lock range in which the engagement between the parking lock pawl 33 and the parking gear 35 is guaranteed. That is, in the present embodiment, in the wall return mode, when the detent roller 26 may exceed the parking lock range, it is regarded as "there is a possibility of the excessive return", and the stop control is preformed. When the detent roller 26 is unlikely to exceed the parking lock range, it is regarded as "there is no possibility of the excessive return" and the stop control is not performed.

Figure 4:
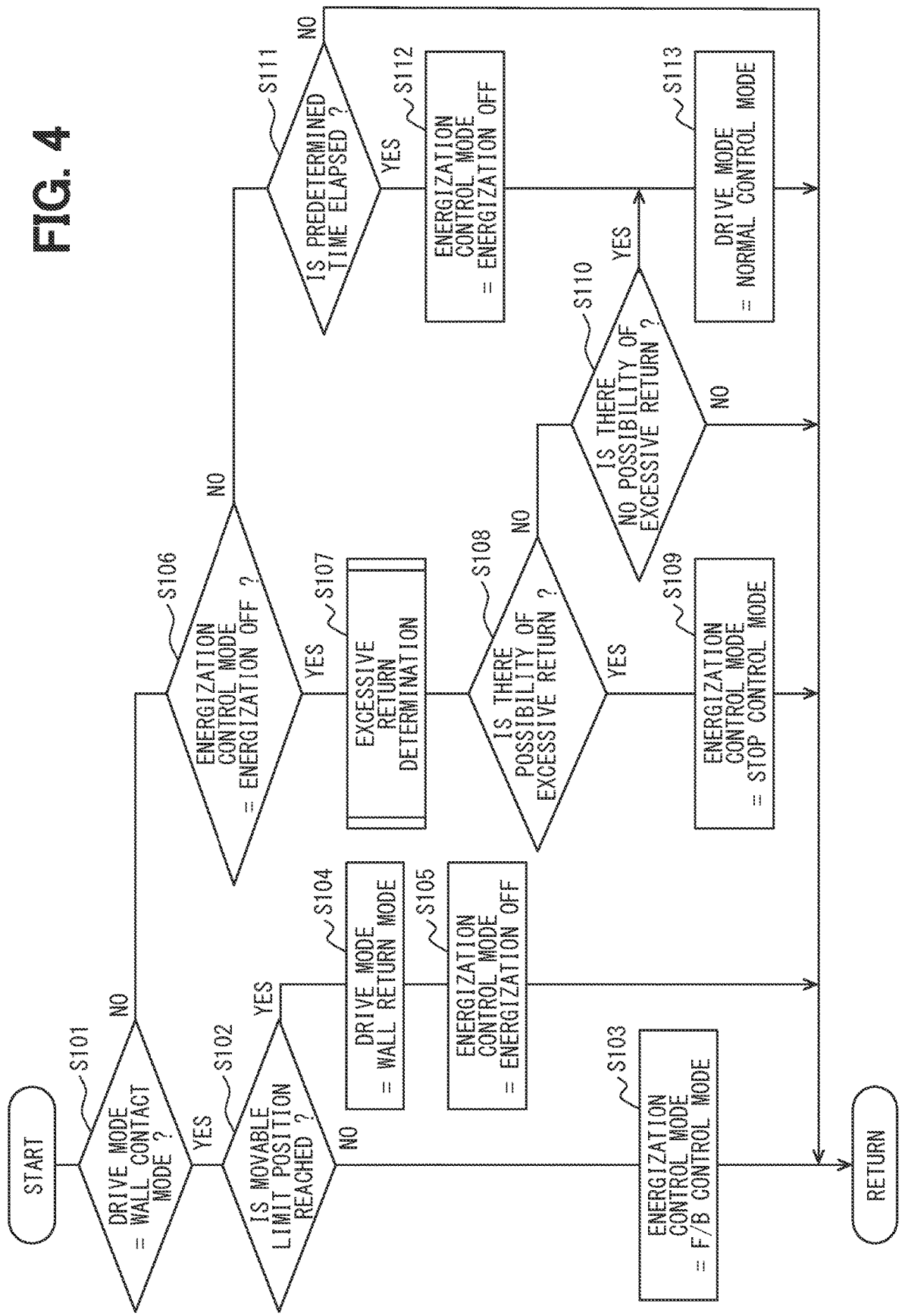
FIG. 4 is a flowchart illustrating a motor drive process according to the first embodiment.

The motor drive process of the present embodiment will be described with reference to the flowchart of FIG. 4. This process is executed by the ECU 50 in a predetermined cycle (for example, 1 [ms]) at the time of learning the reference position. Hereinafter, "step" in step S101 is omitted, and is simply referred to as a symbol "S".

In S101, the ECU 50 determines whether or not the drive mode is the wall contact mode. When it is determined that the drive mode is not the wall contact mode (S101: NO), that is, when the drive mode is the wall return mode, the process proceeds to S106. When it is determined that the drive mode is the wall contact mode (S101: YES), the process proceeds to S102.

In S102, the ECU 50 determines whether or not the detent roller 26 reaches the wall portion 231 and the motor 10 is in the movable limit position. Here, when the state in which the encoder count value θen is not updated continues for a stagnation determination time Tth1, it is determined that the motor 10 has reached the movable limit position. When it is determined that the motor 10 has not reached the movable limit position (S102: NO), the process proceeds to S103. In S103, the ECU 50 sets the energization control mode as a feedback control mode, and drives the motor 10 so that the detent roller 26 moves the wall portion 231. When it is determined that the motor 10 has reached the movable limit position (S102: YES), a current encoder count value θen is learned as a reference position θb, and the process proceeds to S104.

In S104, the ECU 50 sets the drive mode to the wall return mode. In S105, the ECU 50 sets the energization control mode to the energization off. By turning off the energization of the motor 10, the detent roller 26 is driven in a direction away from the wall portion 231 due to the restoring force in the rotation transmission system and the urging force of the detent spring 25, and as a result, the motor 10 is driven in the direction away from the movable limit position.

In S106, the ECU 50 determines whether or not the energization control mode is energization off. When it is determined that the energization control mode is not energization off (S106: NO), that is, when the energization control mode is the stop control mode, the process proceeds to S111. When it is determined that the energization control mode is energization off (S106: YES), the process proceeds to S107 and an excessive return determination is performed.

Figure 5:
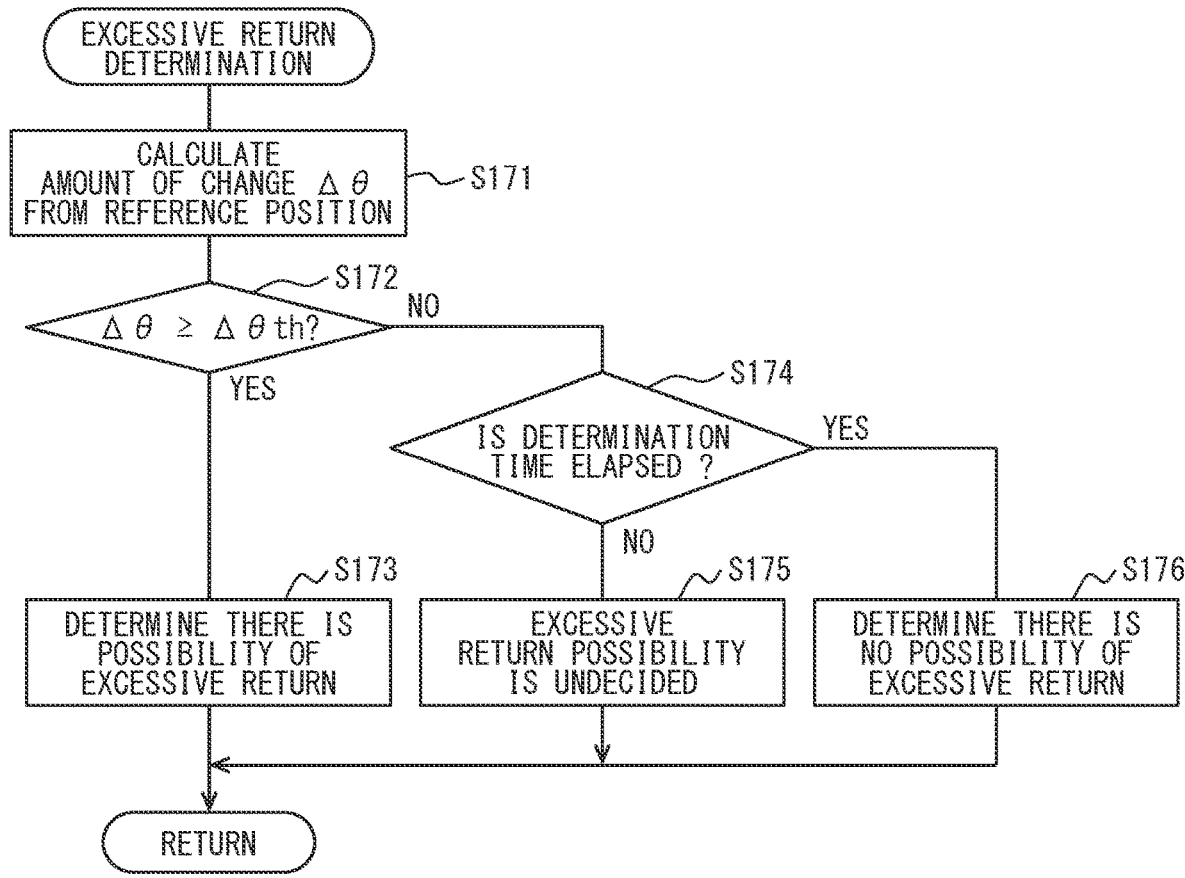
FIG. 5 is a flowchart illustrating an excessive return determination process according to the first embodiment.

The excessive return determination process will be described with reference to the flowchart of FIG. 5. In S171, the excessive return determination unit 55 calculates an amount of change Δθ from a reference position θb learned by the affirmative determination in S103 to the current encoder count value θen. The amount of change Δθ is an absolute value obtained by subtracting the reference position θb from the current encoder count value θen.

In S172, the excessive return determination unit 55 determines whether or not the amount of change Δθ is equal to or greater than the excessive return determination value θth. The excessive return determination value θth is set according to the number of counts between the wall portion 231 and the excessive return determination position. The excessive return determination position is set between a bottom of the valley portion 221 and an apex of the mountain portion 226, and is set closer to the valley portion 221 than a parking lock release position, depending on the shape of the detent plate 21 and the like. When it is determined that the amount of change Δθ is equal to or greater than the excessive return determination value θth (S172: YES), the process proceeds to S173, and it is determined that there is a possibility of the excessive return. When it is determined that the change amount Δθ is less than the excessive return determination value θth (S172: NO), the process proceeds to S174.

In S174, the excessive return determination unit 55 determines whether or not the excessive return determination time Tth2 has elapsed after turning off the energization after the wall contact. The excessive return determination time Tth2 is set based on the time at which the excessive return can be considered not to occur, depending on the motor characteristics, the restoring force of the rotation transmission system, and the like. When it is determined that the excessive return determination time Tth2 has not elapsed since the energization is turned off (S174: NO), the process proceeds to S175, and it is determined that the excessive return possibility is "undecided". When it is determined that the excessive return determination time Tth2 has elapsed from the energization off (S174: YES), the process proceeds to S176, and it is determined that there is no possibility of the excessive return.

Returning to FIG. 4, in S108, which proceeds after the excessive return determination of S107, the ECU 50 determines whether or not it is determined that there is a possibility of the excessive return. When it is determined that there is a possibility of the excessive return (S108: YES), the process proceeds to S109 and the energization control mode is set to the stop control mode. If it is determined that there is no possibility of the excessive return (S108: NO), the process proceeds to S110.

In S110, the ECU 50 determines whether or not it is determined that there is no possibility of the excessive return. If it is determined that there is no possibility of the excessive return (S110: NO), that is, if the possibility of the excessive return is undecided, the energization off is continued. If it is determined that there is no possibility of the excessive return (S110: YES), the process proceeds to S113 and the drive mode is set to the normal control mode. At this time, the energization off is continued.

In S111, which is shifted when the energization control mode is the stop control mode, the ECU 50 determines whether or not the stop control duration Tth3 has elapsed since the stop control mode was started. The stop control duration Tth3 is set according to the time required to stop the motor 10 according to the motor characteristics and the like. When it is determined that the stop control duration time Tth3 has not elapsed since the stop control mode was started (S111: NO), the stop control mode is continued. When it is determined that the stop control duration Tth3 has elapsed since the stop control mode was started (S111: YES), the process proceeds to S112.

In S112, the ECU 50 switches the energization control mode from the stop control mode to the energization off, and turns off the energization of the motor 10. In S113, the ECU 50 sets the drive mode to the normal control mode.

Figure 6:
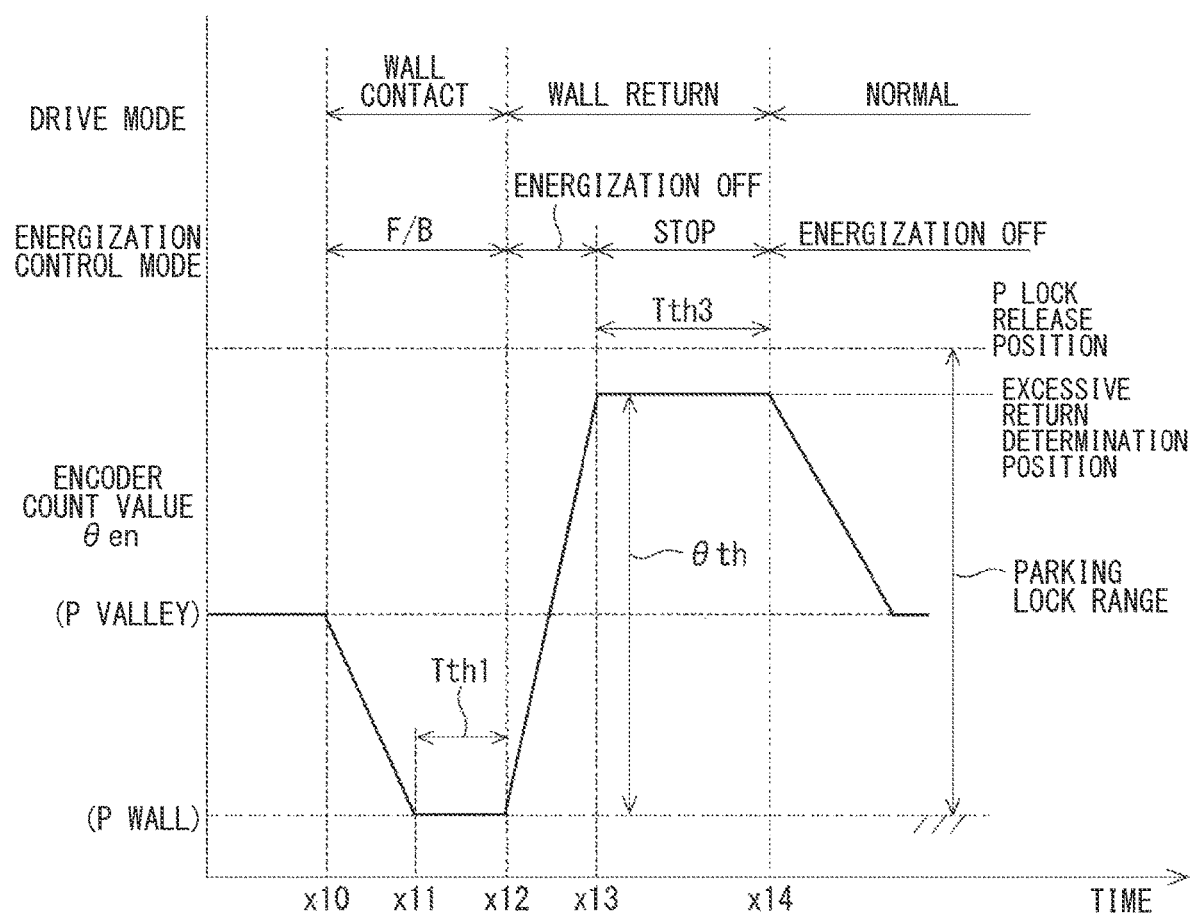
FIG. 6 is a time chart illustrating the motor drive process according to the first embodiment.
Figure 7:
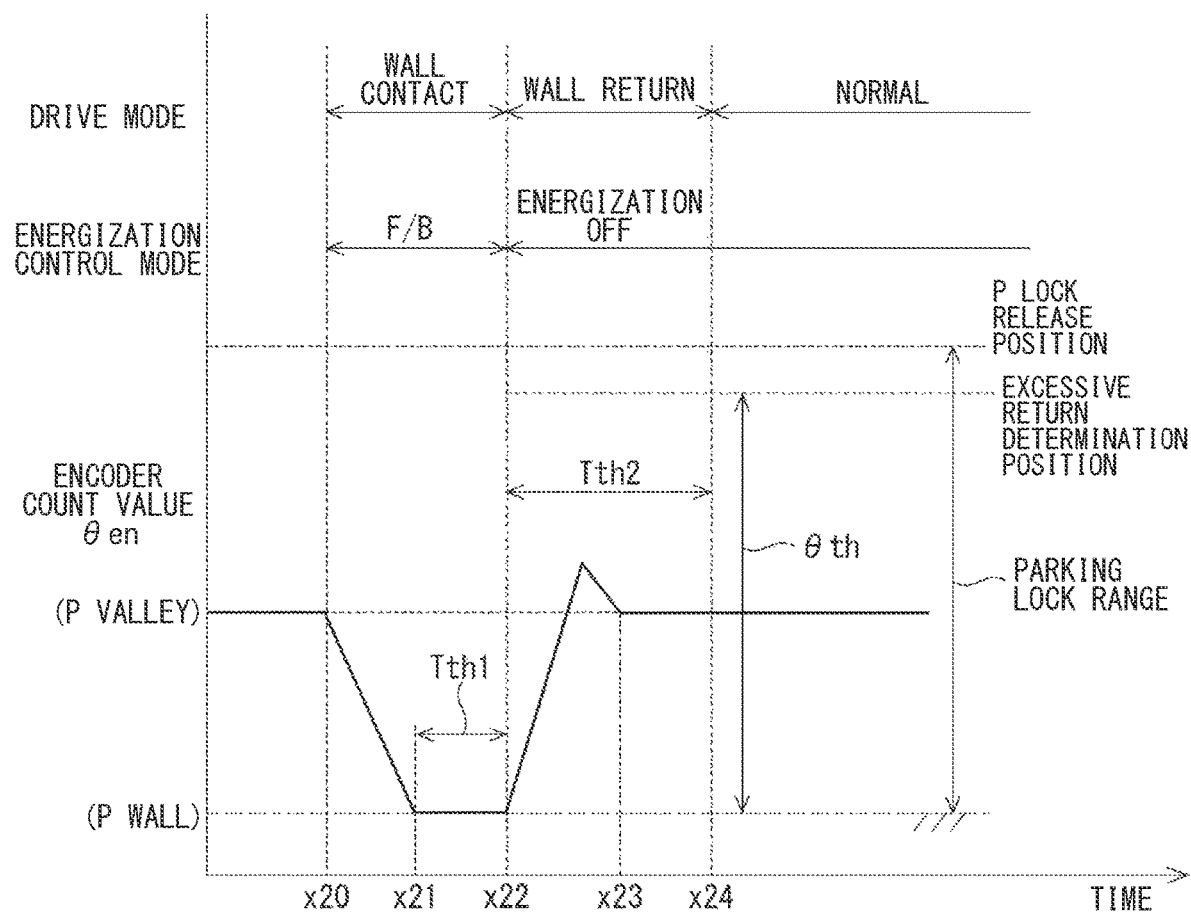
FIG. 7 is a time chart illustrating the motor drive process according to the first embodiment.

The motor drive process of the present embodiment will be described with reference to the time charts of FIGS. 6 and 7. In FIGS. 6 and 7, a common time axis is a horizontal axis, and the drive mode, the energization control mode, and the encoder count value θen are described from the upper stage. Regarding the encoder count value θen, the value when the detent roller 26 is in contact with the first wall portion 231 is defined as "P wall" and the value when the detent roller 26 is located at the bottom of the valley portion 221 is defined as "P valley".

The case where there is a possibility of the excessive return will be described with reference to FIG. 6. When the drive mode becomes the wall contact mode at the time x10, the energization control mode is set to the feedback control mode, and the motor 10 is driven so that the detent roller 26 moves toward the first wall portion 231. When the detent roller 26 comes into contact with the first wall portion 231 at time x11, the encoder count value θen is not updated.

At the time x12 in which the state in which the encoder count value θen is not updated continues over the stagnation determination time Tth1 from the time x11, the encoder count value θen at this time is learned as a reference position θb. In addition, the drive mode is switched from the wall contact mode to the wall return mode, and the energization control mode is switched from the feedback mode to the energization off mode. When the energization of the motor 10 is turned off from the state where the detent roller 26 is in contact with the first wall portion 231, the detent roller 26 is driven in a direction away from the first wall portion 231 by the restoring force of the rotation transmission system and the urging force of the detent spring 25, and the motor 10 rotates in a direction opposite to that at the time of feedback control.

At the time x13, which is a timing before the excessive return determination time Tth2 elapses from the time x12 when the power to the motor 10 is turned off, when the amount of change Δθ from the reference position θb becomes the excessive return determination value θth, it is determined that there is a possibility of the excessive return, the energization control mode is switched from the energization off mode to the stop control mode, and the stationary phase energization control is performed.

At the time x14 in which the stop control is continued over the stop control duration Tth3, the drive mode is switched from the wall return mode to the normal mode, and the energization control mode is switched from the stop control mode to the energization off mode. When the energization of the motor 10 is turned off, the detent roller 26 is returned to the bottom of the valley portion 221 by the urging force of the detent spring 25.

A case where there is no possibility of the excessive return will be described with reference to FIG. 7. The process of time x21 to time x22 is the same as the process of x11 to time x12 in FIG. 6. When the energization is turned off at time x22, the detent roller 26 returns to the bottom of the valley portion 221 at time x23 due to the restoring force of the rotation transmission system and the urging force of the detent spring 25. In such a case, the detent roller 26 does not go out of the parking lock range even if the stop control is not performed.

Therefore, in the present embodiment, when the change amount Δθ until the return determination time Tth2 elapses after the energization is turned off does not exceed the excessive return determination value θth, it is considered that there is no possibility of the excessive return and the stop control is not performed. At the time x24 when the excessive return determination time Tth2 has elapsed from the time x22 when the energization is turned off, the drive mode is switched from the wall return mode to the normal mode and the energization off is continued as the energization control mode. As a result, power consumption and heat generation can be reduced as compared with the case where stop control is performed even when there is no possibility of the excessive return.

As described above, the shift range control device 40 of the present embodiment controls the drive of the motor 10 in the shift-by-wire system 1 including the motor 10 and the shift range switching mechanism 20. The shift range switching mechanism 20 is driven by transmitting the rotation of the motor 10, and is provided with wall portions 231 and 232 that limit the drive.

The shift range control device 40 includes the energization control unit 52 and the excessive return determination unit 55. The energization control unit 52 controls energization to the motor 10. The excessive return determination unit 55 determines whether or not there is a possibility of the excessive return exceeding an allowable return position, when a non-energization return control is performed to return the motor 10 in a direction away from a movable limit position by an external force generated in the shift range switching mechanism 20 by turning off the energization to the motor 10 after driving the motor to the movable limit position where the drive is restricted by the wall portion 231. The "external force generated in the rotation transmission system" is the restoring force of the shift range switching mechanism 20, the urging force of the detent spring 25, and the like.

When it is determined that there is no possibility of the excessive return, the shift range control device 40 continues to turn off the energization, and when it is determined that there is a possibility of the excessive return, the shift range control device 40 performs stop control to stop the motor 10 by energization. This makes it possible to appropriately perform control after driving the motor 10 to the movable limit position. Specifically, when there is a possibility of the excessive return, the motor 10 is stopped by the stop control, so that the detent roller 26 can be appropriately stopped within the allowable range. Further, when there is no possibility of the excessive return, the detent roller 26 does not deviate from the allowable range even if the stop control is not performed. Therefore, it is possible to reduce power consumption and heat generation as compared with the case where the stop control is always performed without performing the excessive return determination.

When the detent roller 26 reaches the excessive return determination position set on the wall portion 231 side from the allowable return position during the period from the start of the non-energization return control to the elapse of the excessive return determination time Tth2, the excessive return determination unit 55 determines that there is a possibility of the excessive return. In other words, if the detent roller 26 does not reach the excessive return determination position by the time the excessive return determination time Tth2 elapses, it is determined that there is no possibility of the excessive return. This makes it possible to appropriately determine whether or not there is a possibility of the excessive return.

The shift range switching mechanism 20 includes the detent plate 21, the detent roller 26, and the detent spring 25. The detent plate 21 has a plurality of valley portions 221 to 224, the mountain portions 226 to 228 separating the valley portions 221 to 224, and wall portions 231 and 232 provided at both ends of the plurality of valley portions 221 and 224 to be arranged. The detent roller 26 can move the valley portions 221 to 224 by driving the motor 10, and the movement is restricted by the wall portions 231 and 231. The detent spring 25 urges the detent roller 26 in a direction of fitting into the valley portions 221 to 224.

The excessive return determination position is set between the bottom of the valley portion 221 adjacent to the wall portion 231 and the apex of the mountain portion 226 formed on the opposite side of the wall portion 231 across the valley portion 221. In the present embodiment, the change amount Δθ from the reference position θb of the encoder count value θen becomes the excessive return determination value θth, which corresponds to "the excessive return determination position set on the wall side from the allowable return position has been reached". This makes it possible to appropriately determine whether or not there is a possibility of the excessive return.

Further, in the present embodiment, the allowable return position is set according to a shift range guarantee range. In the case of the P wall contact, the shift range guarantee range related to the allowable return position is the parking lock range. As a result, it is possible to prevent from being out of the shift range guarantee range due to the excessive return.

Second Embodiment

Figure 8:
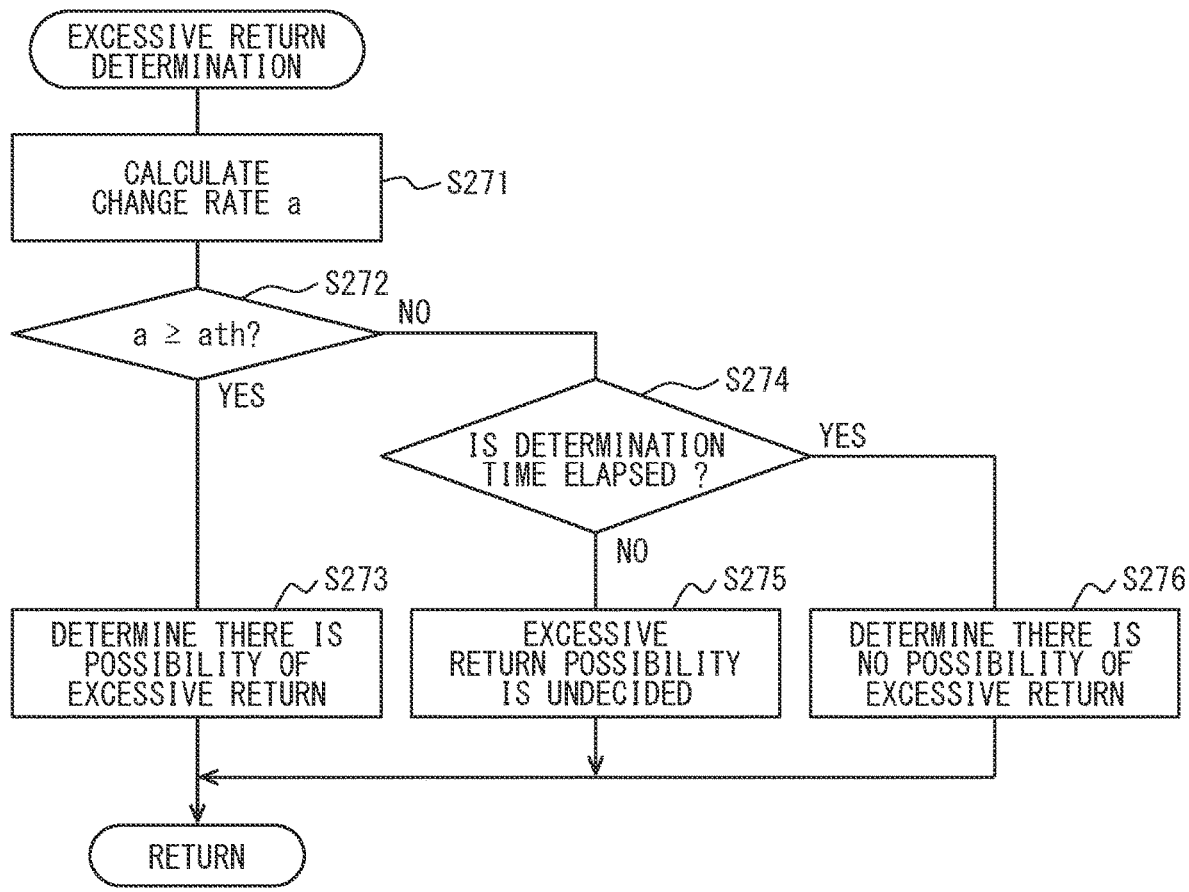
FIG. 8 is a flowchart illustrating an excessive return determination process according to a second embodiment.

A second embodiment is shown in FIG. 8. Since the excessive return determination is different from the above embodiment in the present embodiment, this point will be mainly described. The excessive return determination process of the present embodiment will be described with reference to the flowchart of FIG. 8.

In S271, the excessive return determination unit 55 calculates the change rate a of the encoder count value θen per unit time when the energization is off (see equation (1)). Δt in the equation is the elapsed time from the start of energization off.

$$a = \Delta\theta/\Delta t \qquad (1)$$

In S272, the excessive return determination unit 55 determines whether or not the change rate a is equal to or greater than the excessive return determination value ath. The excessive return determination value ath is set according to the shape of the detent plate 21, the motor characteristics, and the like. When it is determined that the change rate a is equal to or greater than the excessive return determination value ath (S272: YES), the process proceeds to S273, and it is determined that there is a possibility of the excessive return. When it is determined that the change rate a is less than the excessive return determination value ath (S272: NO), the process proceeds to S274. The processes of S274 to S276 are the same as the processes of S174 to S176 in FIG. 5.

In the present embodiment, the excessive return determination unit 55 determines whether or not there is a possibility of the excessive return based on the change rate of the encoder count value θen in the non-energization return control. This configuration also achieves the same effects as those of the embodiment described above.

In the embodiment, the shift range control device 40 corresponds to the "motor control device", and the shift-by-wire system 1 corresponds to the "motor drive system" and the "shift range switching system". The shift range switching mechanism 20 corresponds to the "rotation transmission system", the detent plate 21 corresponds to the "detent member", the wall portions 231 and 232 correspond to the "drive limiting portion", the detent spring 25 corresponds to the "urging member", and the detent roller 26 corresponds to the "engagement member". Further, the encoder count value θen corresponds to the "motor rotation angle".

In the above embodiment, the P wall contact that brings the detent roller 26 into contact with the first wall portion 231 has been mainly described. In the P wall contact, the first wall portion 231 corresponds to the "contact wall portion". Further, in the case of the D wall contact in which the detent roller 26 is brought into contact with the second wall portion 232, the second wall portion 232 corresponds to the "contact wall portion". In the case of the D wall contact, the excessive return determination position is set between the bottom of the valley portion 224 and the apex of the mountain portion 228. Further, the allowable return position in this case is set according to the shift range guarantee range that guarantees the shift range corresponding to the valley portion 224. That is, in the case of the D wall contact, the allowable return range is set according to the D range guarantee range.

OTHER EMBODIMENTS

In the above embodiment, in the wall contact mode, the energization control mode is set as the feedback mode. In another embodiment, as the drive control method of the motor 10 in the wall contact mode, any control method such as feedforward control may be used.

In the above embodiment, an encoder is used as the rotation angle sensor. In another embodiment, the rotation angle sensor may be a linear sensor such as a resolver as long as it can detect the rotation position of the rotor. In the above embodiment, the potentiometer is exemplified as the output shaft sensor. In other embodiments, the output shaft sensor may be something other than a potentiometer, or the output shaft sensor may be omitted.

In the above embodiment, the motor is a switched reluctance motor. In other embodiments, it may be something other than a switched reluctance motor, for example, a DC brushless motor or the like. According to the embodiments described above, the four valley portions are formed in the detent plate. As another embodiment, the number of the valley portions is not limited to four but may be any number. For example, the detent plate may have two valley portions and the P range and the NotP range may be switched. The shift range switching mechanism and the parking lock mechanism or the like may be different from those in the embodiments described above. Further, in the above embodiment, the motor control device is applied to the shift range switching system. In other embodiments, the motor control device may be applied to an in-vehicle system other than the shift range switching system, or a motor drive system other than the in-vehicle.

In the embodiment described above, the decelerator is placed between the motor shaft and the output shaft. Although the detail of the decelerator is not mentioned in the above embodiment, the decelerator may have any configuration, such as one using a cycloid gear, a planetary gear, or a spur gear that transmits a torque from a speed reduction mechanism substantially coaxial with the motor shaft to the drive shaft, and one using these gears in combination. As another embodiment, the decelerator between the motor shaft and the output shaft may be omitted, or a mechanism other than the decelerator may be provided.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A motor control device that controls a drive of a motor in a motor drive system including the motor, a rotation transmission system provided with a drive limiting portion configured to limit the drive while a rotation of the motor is transmitted and driven, the motor control device comprising:
   an energization control unit configured to control an energization to the motor; and
   an excessive return determination unit configured to determine whether or not there is a possibility of an excessive return exceeding an allowable return position, when a non-energization return control is performed to return the motor in a direction away from a movable limit position by an external force generated in the rotation transmission system by turning off the energization to the motor after driving the motor to the movable limit position where the drive is restricted by the drive limiting portion,
   wherein
   when it is determined that there is no possibility of the excessive return, the energization is continuously turned off, and
   when it is determined that there is a possibility of the excessive return, a stop control configured to stop the motor by energizing is performed.

2. The motor control device according to claim 1, wherein the excessive return determination unit determines that there is a possibility of the excessive return, when an excessive return determination position set on the movable limit position side from the allowable return position is reached between a start of a non-energization return control and an elapse of an excessive return determination time.

3. The motor control device according to claim 2, wherein the rotation transmission system has
   a detent member formed with a plurality of valley portions, a mountain portion separating the valley portions, and a wall portion which is a drive limiting portion provided at both ends of the valley portions to be arranged,
   an engagement member which is movable in the valley portion by the drive of the motor and limits the drive of the motor by contacting the wall portion, and
   an urging member configured to urge the engagement member in a direction to fit in the valley portion,
   when the engagement member is brought into contact with one of the wall portion, the wall portion is defined as a contact wall portion, and
   the excessive return determination position is set between a bottom of the valley portion adjacent to the contact wall portion and an apex of a mountain portion formed on an opposite side of the wall portion across the valley portion.

4. The motor control device according to claim 1, wherein the excessive return determination unit determines that there is a possibility of the excessive return based on a change rate in a rotation angle of the motor in the non-energization return control.

5. The motor control device according to claim 1, wherein
the motor drive system is applied to a shift range switching system, and
the allowable return position is set according to a shift range guarantee range.

6. The motor control device according to claim 1, wherein
when a position where the motor reaches a movable limit position by a sensor that detects a rotational position of the motor is defined as a reference position,
the excessive return determination unit calculates an amount of change from the reference position to a current position, and determines that there is a possibility of the excessive return when the amount of change is equal to or greater than an excessive return determination value θth.

7. A motor drive system, comprising:
a motor;
a rotation transmission system provided with a drive limiting portion configured to limit the drive while a rotation of the motor is transmitted and driven; and
a motor control device configured to control a drive of the motor, wherein the motor control device includes a computer including a processor and a memory that stores instructions configured to, when executed by the processor, cause the processor to control an energization to the motor, determine whether or not there is a possibility of an excessive return exceeding an allowable return position, when a non-energization return control is performed to return the motor in a direction away from a movable limit position by an external force generated in the rotation transmission system by turning off the energization to the motor after driving the motor to the movable limit position where the drive is restricted by the drive limiting portion, turn off continuously the energization to the motor, when it is determined that there is no possibility of the excessive return, and stop the motor by energizing, when it is determined that there is a possibility of the excessive return.

\* \* \* \* \*